April 21, 1959 C. E. PARKER Re. 24,638

APPARATUS FOR HANDLING VENEER

Original Filed Aug. 4, 1948 7 Sheets-Sheet 1

INVENTOR.
Clarence E. Parker
BY Hudson, Boughton, Williams, David & Hoffmann
ATTORNEYS April 21, 1959 C. E. PARKER Re. 24,638

APPARATUS FOR HANDLING VENEER

Original Filed Aug. 4, 1948 7 Sheets-Sheet 2

INVENTOR.
Clarence E. Parker
BY Hudson, Boughton, Williams, David & Hoffmann
ATTORNEYS April 21, 1959 C. E. PARKER Re. 24,638

APPARATUS FOR HANDLING VENEER

Original Filed Aug. 4, 1948 7 Sheets-Sheet 3

INVENTOR.
Clarence E. Parker
BY Hudson, Boughton, Williams, David & Hoffmann
ATTORNEYS

APPARATUS FOR HANDLING VENEER

Original Filed Aug. 4, 1948 7 Sheets-Sheet 4

INVENTOR.
Clarence E. Parker
BY Hudson, Boughton, Williams, David & Hoffmann.
ATTORNEYS

APPARATUS FOR HANDLING VENEER

Original Filed Aug. 4, 1948 7 Sheets-Sheet 5

INVENTOR.
Clarence E. Parker
BY Hudson, Boughton, Williams, David & Hoffmann
ATTORNEYS

APPARATUS FOR HANDLING VENEER

Original Filed Aug. 4, 1948 7 Sheets-Sheet 6

INVENTOR.
Clarence E. Parker
BY Hudson, Boughton, Williams, David & Hoffmann.
ATTORNEYS

APPARATUS FOR HANDLING VENEER

Original Filed Aug. 4, 1948 7 Sheets-Sheet 7

INVENTOR.
Clarence E. Parker
BY Hudson, Boughton, Williams, David & Hoffmann
ATTORNEYS United States Patent Office Re. 24,638

Reissued Apr. 21, 1959

24,638

APPARATUS FOR HANDLING VENEER

Clarence E. Parker, Painesville, Ohio, assignor to The Coe Manufacturing Company, Painesville, Ohio, a corporation of Ohio Original No. 2,649,182, dated August 18, 1953, Serial No. 42,373, August 4, 1948. Application for reissue October 23, 1958, Serial No. 775,668

25 Claims. (Cl. 198—21)

Matter enclosed in heavy brackets [ ] appears in the original patent but forms no part of this reissue specification; matter printed in italics indicates the additions made by reissue.

The present invention relates to material handling apparatus of the feeder type and, more particularly, to apparatus for feeding veneer to a multiple deck conveyor type veneer dryer from a stack of veneer.

The principal object of the invention is the provision of a simple, inexpensive and reliable apparatus for feeding veneer from a stack of veneer to a multipledeck conveyor type veneer dryer with minimum effort on the part of an operator.

A more specific object of the invention is the provision of a novel and improved apparatus for feeding veneer from a stack of veneer to a multiple deck conveyor type veneer dryer in predetermined relation upon the top piece of a stack of veneer being pushed forwardly of the stack proper a small amount by an operator.

The invention resides in certain constructions and combinations and arrangements of parts and further objects and advantages will be apparent to those skilled in the art to which it relates from the following description of the preferred embodiment described with reference to the accompanying drawings forming a part of this specification in which similar reference characters designate corresponding parts, and in which—

Figures 1, 2:
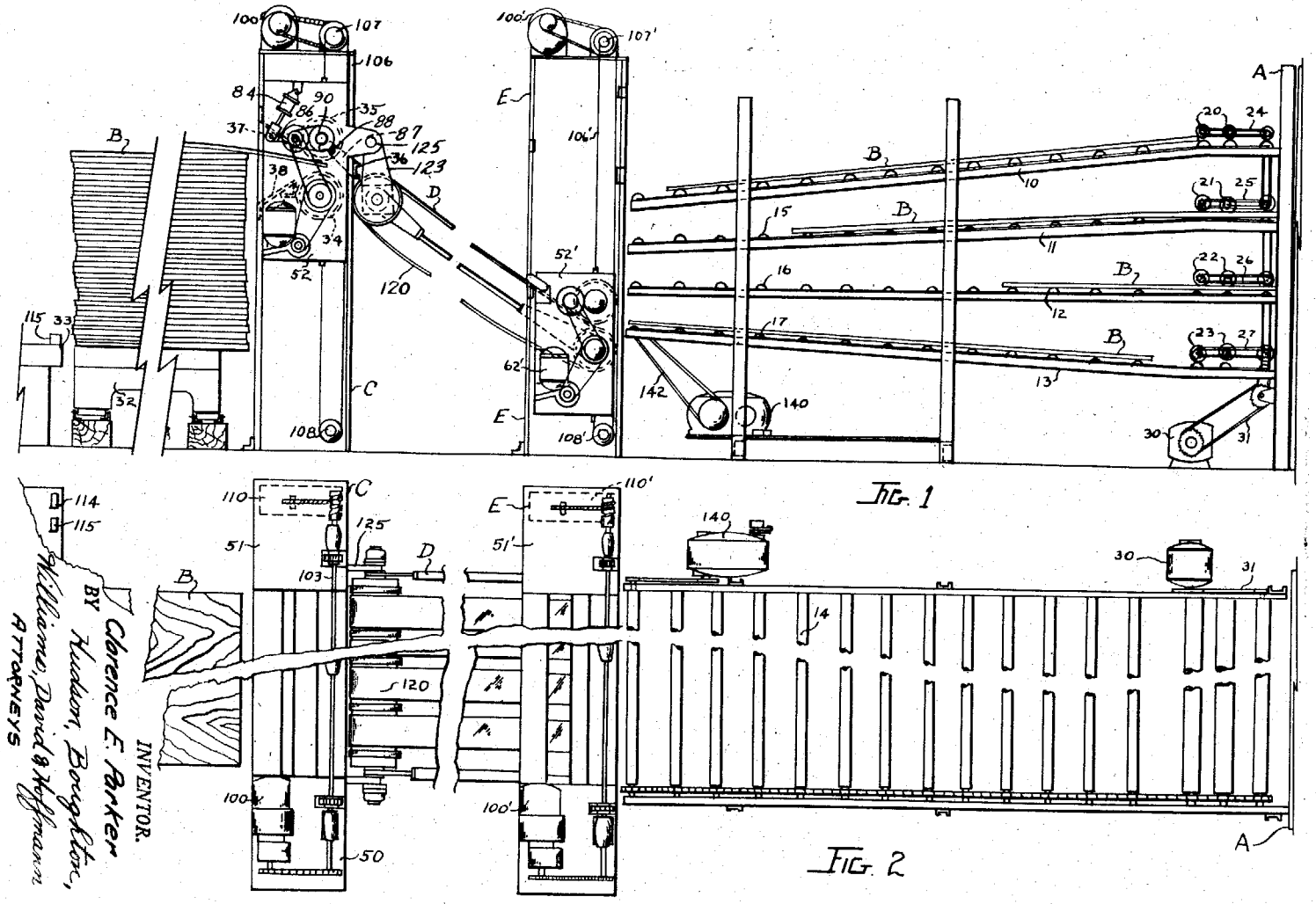
Fig. 1 is a side elevational view of apparatus embodying the present invention for feeding veneer to a conveyor type veneer dryer.
Fig. 2 is a plan view of the apparatus shown in Fig. 1.
Figure 3:
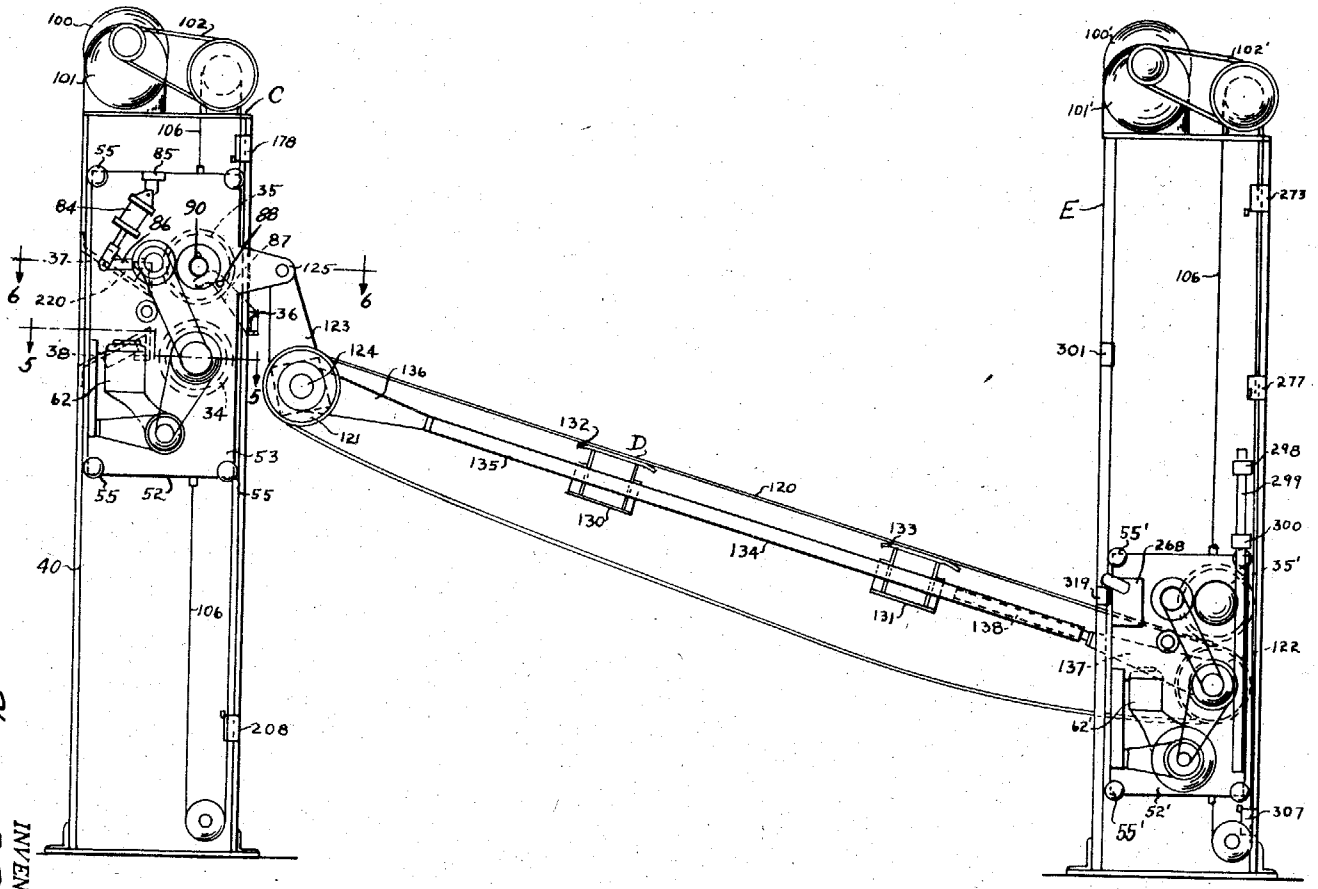
Fig. 3 is an enlarged, side elevational view of the feeder mechanism proper shown in Figs. 1 and 2.
Figure 4:
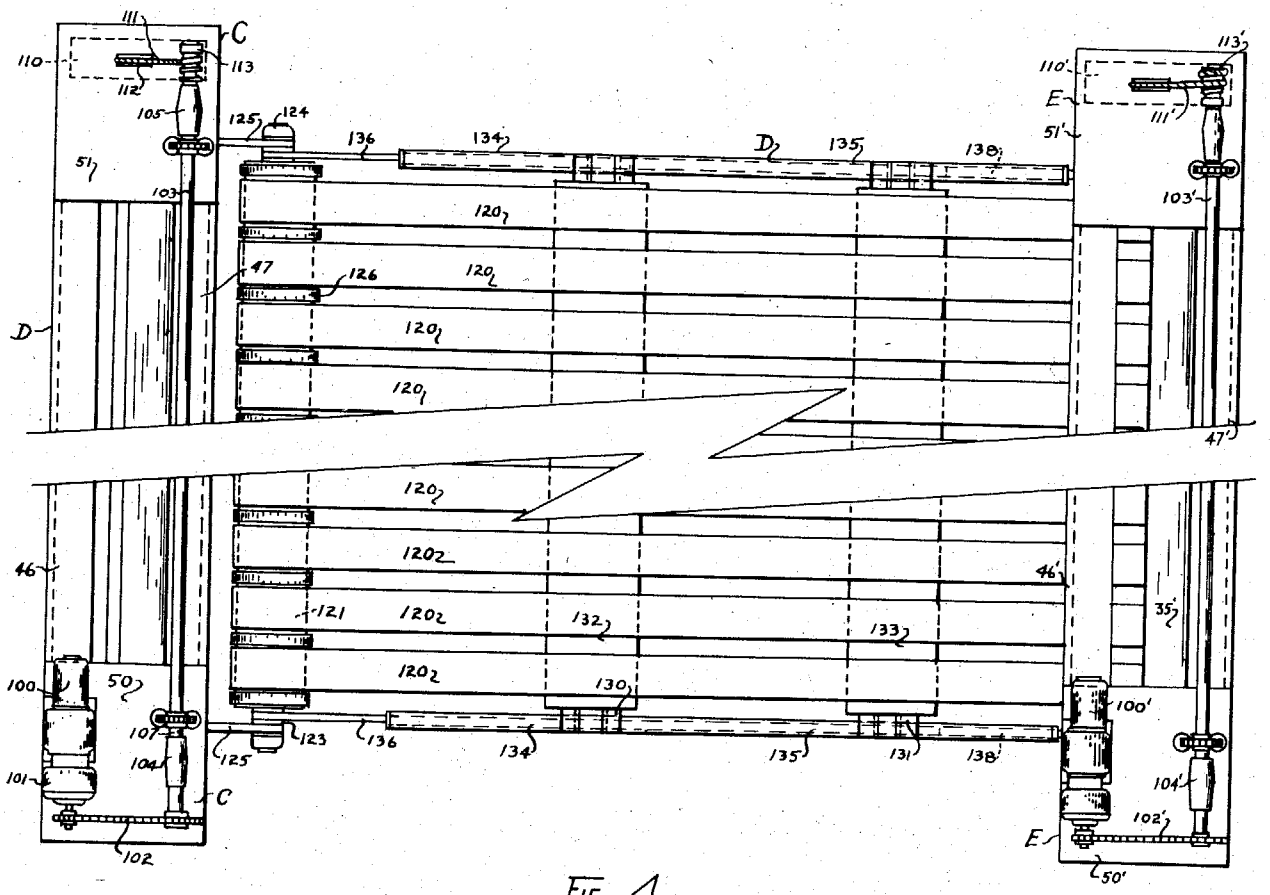
Fig. 4 is a fragmentary, enlarged plan view of the mechanism shown in Fig. 2.
Figure 5:
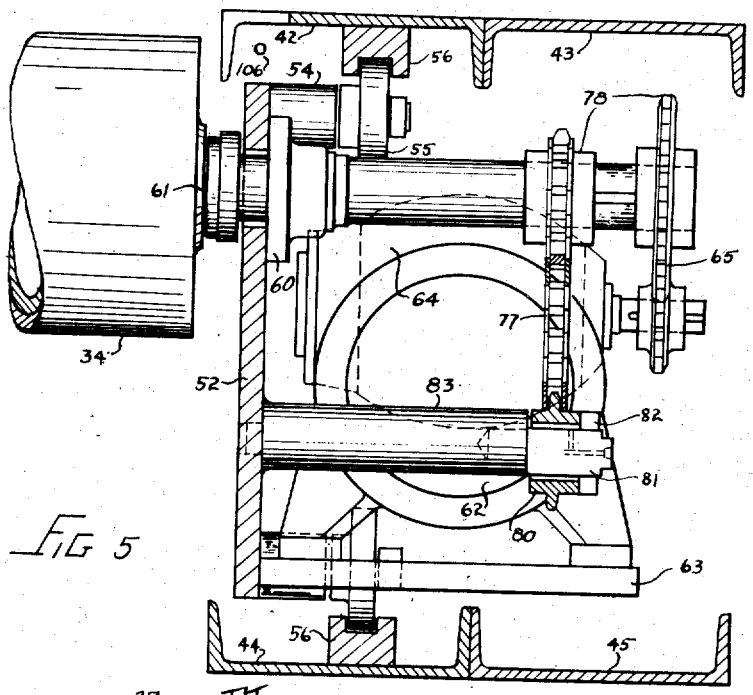
Fig. 5 is a sectional view, with portions in elevation, approximately on the line 5—5 of Fig. 3.
Figure 6:
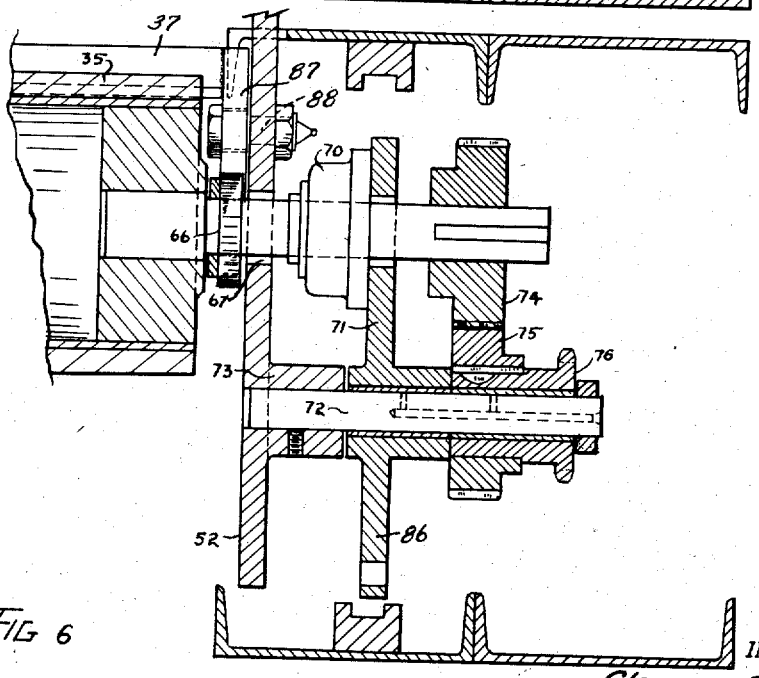
Fig. 6 is a sectional view, with portions in elevation, approximately on the line 6—6 of Fig. 3.
Figure 7:
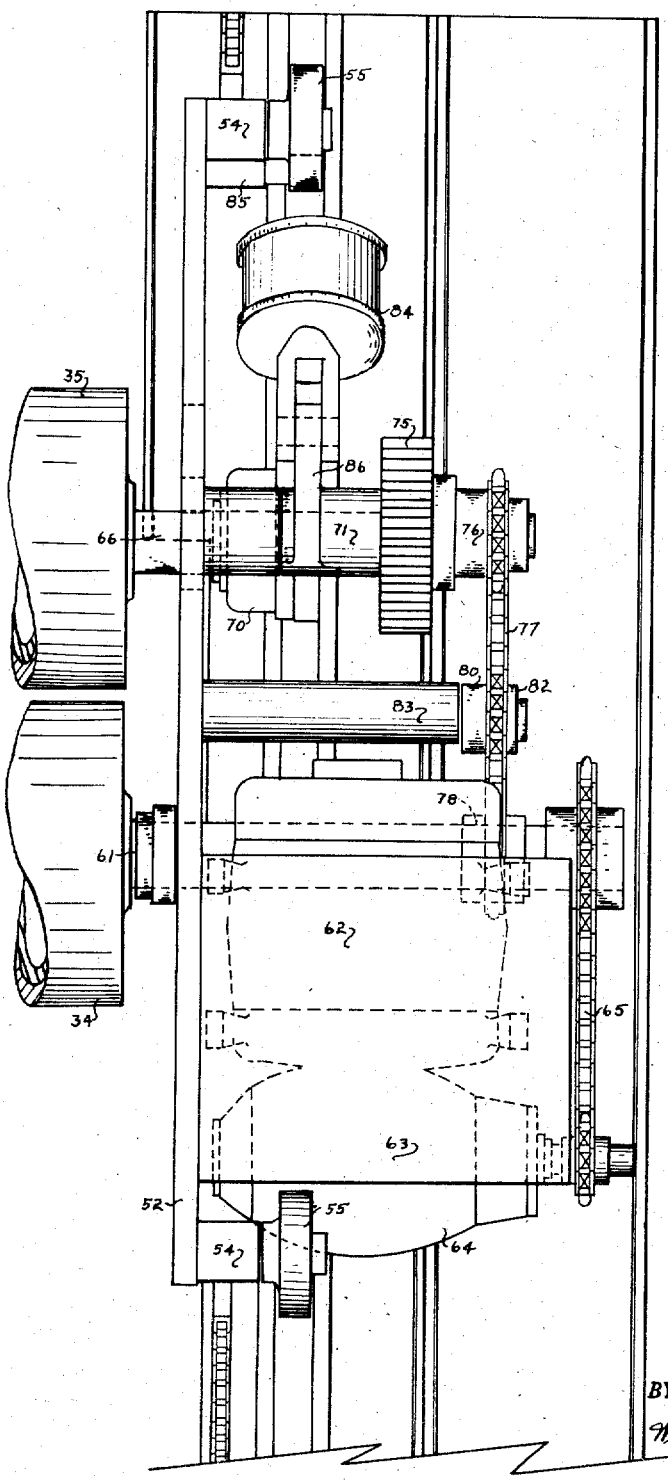
Fig. 7 is a fragmentary, elevational view, with portions broken away, looking at the right-hand end of the apparatus shown in Fig. 3.
Figure 8:
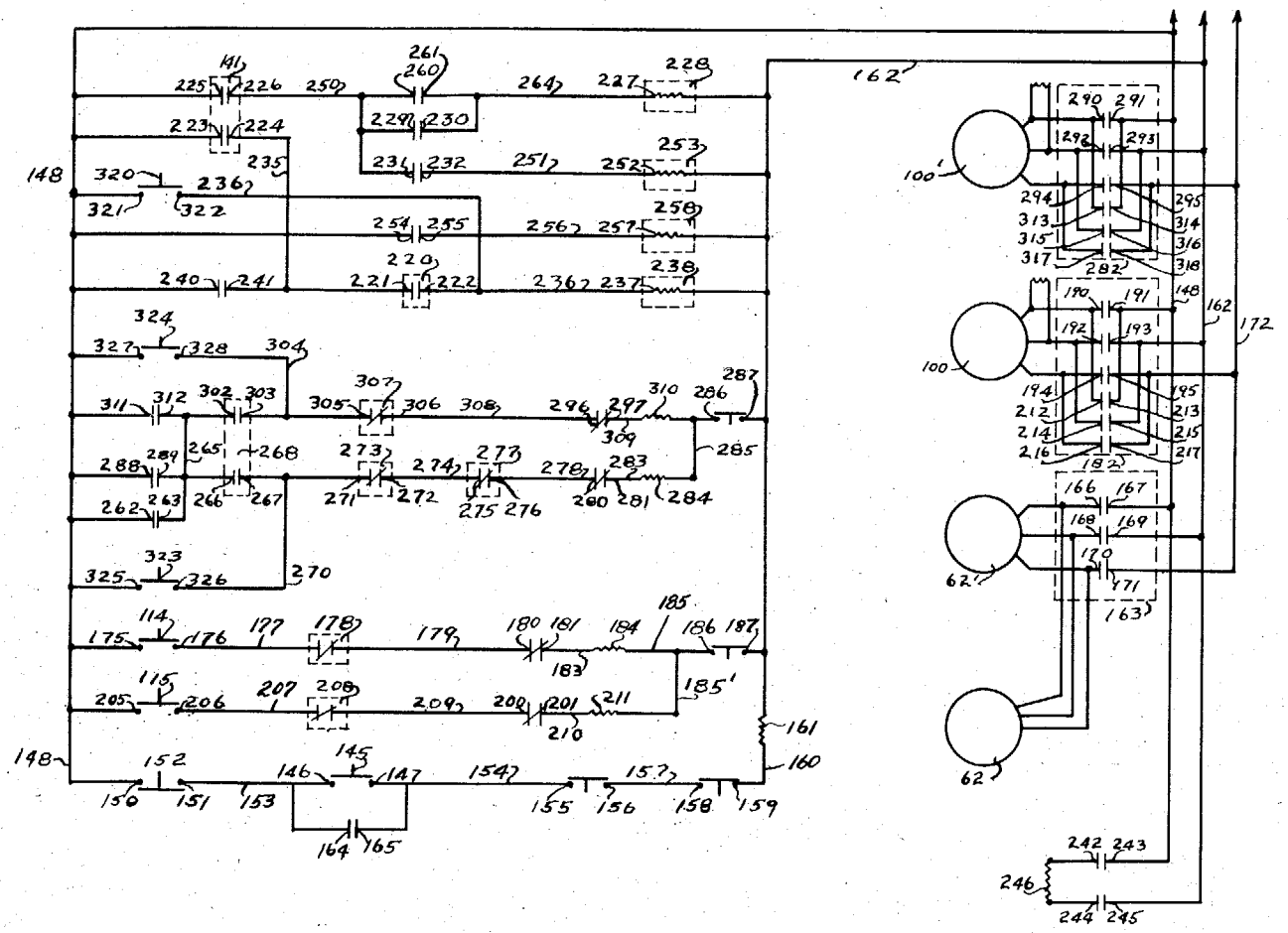
Fig. 8 is a wiring diagram of the electrical circuits of the apparatus.

Referring to Figs. 1 to 8 of the drawings which show the preferred embodiment, the reference character A designates the in-feed end of a four-deck, conveyor type, veneer dryer of commercial construction. The dryer A is not herein shown and described in detail because dryers of the type referred to are well known in the art and the dryer per se forms no part of the present invention. As shown, the dryer comprises four decks 10, 11, 12, 13 of in-feed rollers 14, 15, 16, 17, respectively. The rollers of the respective decks are all driven at a predetermined uniform speed by suitable means, such as, a sprocket chain, and operate to move sheets of veneer, indicated by the reference character B, to pairs of top rollers 20, 21, 22 and 23 which cooperate with the rollers 14, 15, 16, 17 at the right-hand ends of the decks 10, 11, 12, 13, respectively, to feed the veneer to the dryer proper. As shown, the pairs of top rollers 20, 21, 22, 23 are carried by arms 24, 25, 26, 27 pivoted at their right-hand ends on transversely extending shafts located above the plane of the decks proper. Gravity holds the top rollers in engagement with the top sides of the sheets of veneer. The rollers of the various decks are driven, as shown, from an electric motor 30 connected thereto by suitable sprocket chains, designated generally by the reference character 31, and the ends of the decks toward the feeding mechanism proper, hereinafter more specifically described, converge toward each other; however, this is not essential to the present invention and the decks may be otherwise arranged.

The usual practice is to bring the veneer to the dryer on trucks and have workmen remove the veneer from the trucks and feed it into the various decks of the dryer by hand. The present invention does not contemplate any change in the conventional manner of bringing the veneer to the dryer and, as shown, the veneer B is brought to the infeed end of the dryer A, or, more specifically, to the infeed end of the feeding mechanism stacked upon a truck 32 of conventional construction. The operator either standing upon the floor or upon a raised platform 33 pushes the top piece of veneer on the stack between the rubber covered pinch rolls 34, 35 of the feed end unit C of the feeding mechanism until it strikes a stop 36. The pinch rolls 34, 35 are movable vertically, as will be hereinafter described, so that the pinch rolls can be maintained in substantial alignment with the top of the stack of veneer upon the truck, thereby facilitating the feeding of the top piece of veneer between the pinch rolls. Guide members 37, 38 extending transversely across the feed end unit in front of the pinch rolls 34, 35 provide means for guiding the veneer into the feed end unit even though the pinch rolls are not exactly aligned with the top of the stack of veneer.

The feeding mechanism comprises the feed end unit C, a floating conveyor *or guide* table D, and a discharge end unit E. The feed end unit C comprises a frame and a vertically movable assembly. The frame includes right and left-hand vertical columns 40, 41, each composed of four channel irons 42, 43, 44, 45 arranged as clearly shown in Fig. 5. In addition to the channel irons referred to, the frame comprises transversely extending angle members 46, 47 connected to the top of the channel members and by right and left-hand top plates 50, 51 to each other. The vertically movable assembly of the feed end unit C includes vertically movable end plates 52 housed within the columns 40, 41 and having suitable tubular members 54 welded thereto for supporting rollers 55, one located at each of the four corners of the frames. The rollers 55 engage within suitable tracks 56 at opposite sides of the columns and guide the movable plates 52 during their vertical movement. The tracks or guides 56 are carried by the inner channel irons 42, 44.

Opposite plates 52 of the vertically movable assembly of the feed end unit C are provided with suitable bearings 60 welded thereto for supporting the shaft-like ends 61 of the bottom roll 34. The right-hand end of the shaft 61 extends beyond the bearing 60 and is adapted to be driven from an electric motor 62 mounted on a plate 63 welded to the right-hand plate 52 of the vertically movable assembly and operatively connected to the shaft 61 through a gear reduction 64 and a sprocket chain drive, designated generally by the reference character 65.

The upper roll 35 of the feed end unit C is similar to the lower roll 34 and includes shaft-like extensions 66 projecting from opposite ends, which shaft-like extensions project through elongated slots 67 in the plates 52 where they are supported in suitable bearings 70 fixedly connected to the free ends of levers 71 pivoted about stud shafts 72 connected to the plates 52 by sleeve members 73 welded to the plates 52. The right-hand end of the roll 35 is adapted to be driven by a pair of gears 74, 75, the former of which is keyed to the right-hand end of the shaft 66 and the latter to the hub of a sprocket wheel 76 rotatably supported on the projecting end of the shaft 72. The sprocket wheel 76 is adapted to be driven from the shaft 61 by a sprocket chain 77 operatively connected to the sprocket wheel 76 and to a sprocket wheel 78 keyed to the shaft 61. An idler sprocket wheel 80 is supported on an eccentric 81 and held assembled thereon by a nut 82. The eccentric 81 is adjustably carried by a pin 83 welded to the adjacent plate 52 and provides means for adjusting the tension of the sprocket chain 77. The construction just described is such that the two pinch rolls 34 and 35 are rotated at uniform speed by the motor 62.

The weight of the upper roll 35 tends to keep it in engagement with the lower roll 34 but the upper roll 35 is normally maintained in spaced relation to the lower roll by fluid pressure operated motors 84, one at either side of the in-feed unit C, the cylinder assemblies of which are pivotally connected to brackets 85 fixed to the plates 52 and the piston assemblies of which are pivotally connected to arms 86 formed integral with the arms or levers 71 which carry the bearings 70 for the upper roll 35. The control for supply of pressure fluid to the motors 84 will be hereinafter specifically referred to and is such that the motors 84 can be operated to move the upper roll 35 toward and from the lower roll 34 and during the operation of the machine this is automatically effected periodically to feed a piece of veneer, the end of which has been pushed into the opening between the pinch rolls 34, 35 by the operator.

A suitable stop in the form of a transversely extending channel member 36 normally positioned in the path of veneer being pushed between the pinch rolls 34, 35, limits the forward movement of the veneer as it is pushed forward by the operator. The stop 36 is fixedly connected to the right-hand end of levers 87 pivotally connected intermediate their ends to the plates 52 by pivots 88. The oppositely extending, free ends of the arms 87 project underneath antifriction bearings 90 on the shaft-like part 66 of the upper roll 35 and when the upper roll is lowered, the engagement between the bearing members 90 and the ends of the levers 87 will cause the levers 87 to be pivoted about their pivots 88 and the stop or channel member 36 raised out of the path of the veneer.

The vertically movable assembly of the feed end unit C and the operating mechanism forming a part thereof or connected thereto, including the pinch rolls 34, 35 and the feed end of the floating conveyor table D, are adapted to be moved vertically so that the pinch rolls will be aligned or approximately aligned with the top of the stack of veneer upon the truck 32 by an infeed end unit, reversible electric hoist motor 100 including a solenoid release brake and connected by a gear reduction unit 101 and a sprocket chain drive 102 to a transversely extending shaft 103 extending across the top of the frame of the feed end unit C and rotatably supported in a plurality of bearings 104, 105. The shaft 103 is connected to the vertically movable plates 52 by a sprocket chain 106, opposite ends of which are connected to the plates 52 and which sprocket chains encircle upper and lower sprocket wheels 107, 108. The upper sprocket wheels 107 are keyed to the shaft 103 and the lower sprocket wheels 108 are rotatably connected to the side columns of the feed end unit C adjacent to the floor. The weight of the vertically movable assembly is counterbalanced by a weight 110 slidably supported between the two outside channel members of the left-hand column of the frame of the feed end unit C and operatively connected to the left end of the shaft 103 by a cable 111 connected thereto and, after passing over a sheave 112, rotatably supported at the top of the left-hand column of the frame to a drum 113 keyed to the left-hand end of the shaft 103. The hoist motor 100 may be operated in opposite directions to raise and lower the vertically movable assembly and align the pinch rolls 34, 35 with the top of the stack of veneer on the truck 32 by the operator through suitable control means, such as, foot-operated switches 114, 115 on the platform 33, the former of which causes the motor 100 to operate in one direction when depressed and the latter in the opposite direction.

The floating conveyor table D comprises a plurality of belts 120 encircling rolls 121, 122 at opposite ends of the table. The roll 121 adjacent to the in-feed unit C is rotatably supported to the lower end of levers 123, one located at each end of the roll, by shaft-like extensions 124 on the roll proper. The upper ends of the levers 123 are pivotally connected to projections 125 on opposite plates 52 of the vertically movable assembly of the feed end unit C. The lower or exit end roll 122 forms a part of the discharge end unit E which is similar in construction to the feed end unit C and is not herein shown and described in detail; however, the corresponding parts, with the exception of the roll 122, are designated by the same reference characters with prime marks added. The roll 122 comprises shaft-like extensions on opposite ends of the roll proper, which extensions are rotatably supported in suitable bearings welded to the plates 52′ of the vertically movable assembly of the discharge end unit E. The roll 122 occupies the same position in the discharge end unit E that the roll 34 occupies in the feed end unit C but is slightly different in construction from the roll 34 because it carries the belts 120 whereas the roll 34 directly engages the veneer. The belts 120 are maintained in predetermined spaced relation to each other in the rolls 121, 122 by bands 126 of belting encircling the rolls and fixed thereto in some suitable manner.

The belts 120 are supported intermediate the rolls 121, 122 by transversely extending beams 130, 131 provided with top plates 132, 133 upon which the upper reaches of the belts 120 rest. Opposite ends of the beams 130, 131 are supported by side assemblies 134 comprising tubular members 135 to which the transversely extending beams 130, 131 are directly connected and end members 136, 137. The end members 136 are pivotally connected to the shaft-like extensions 124 of the roll 121 and are fixedly secured to the tubular members 135 as by being welded thereto. The lower end members 137 are pivotally connected to the shaft-like extensions of the roll 122 and have elongated, cylindrical ends 138 which are slidably supported within the lower ends of the tubular members 135, which construction permits the length of the side assemblies 134 and the table to vary as the vertically movable assemblies of the end units C and E are raised and lowered. This together with the fact that the upper end of the conveyor D is pivotally connected to the links 123 which links are in turn pivotally connected to the extensions 125 on the side plates 52 of the vertically movable assembly of the feed end unit C, allows the conveyor to function properly for any position of the apparatus.

With the exception of the fact that the upper roll 35′ of the pinch rolls of the discharge end unit E continuously rides upon the belts 120, the discharge end unit E is similar in construction and operation to the upper roll 35 of the pinch rolls of the feed end unit C. In addition to being supported in a manner similar to the pinch rolls 34, 35 of the feed end unit C, the rolls 121, 35′ of the discharge end unit E are driven in a similar manner from an electric motor 62′ corresponding to the motor 62 of the feed end unit C. The motor 62′ drives the belts 120 through the roll 121 and the construction is such that a sheet of veneer fed to the floating conveyor table D by the pinch rolls 34, 35 will be moved along the table by the belts 120 and discharged by the pinch rolls 122, 35' upon one of the decks 10, 11, 12, or 13 of the in-feed end of the veneer dryer A.

The vertically movable assembly of the discharge end unit E is counterbalanced in a manner similar to that in which the vertically movable assembly of the feed end unit C is counterbalanced and is adapted to be moved vertically by a discharge end unit, electrical hoist motor 100' corresponding to the hoist motor 100 and connected to the rolls of the vertically movable assembly in a similar manner to that in which the hoist motor 100 is connected to the corresponding assembly of the feed end unit C. The control for the motor 100', however, is different from the control for the motor 100. The control for the motor 100' is such that the vertically movable assembly of the discharge end unit E is automatically moved to sequentially discharge a sheet of veneer B from the floating table D onto the decks 10, 11, 12, 13, successively and to continuously repeat the cycle so long as the mechanism continues in operation. The movement of the vertical assembly of the discharge end unit E and the closing and opening of the pinch rolls 34, 35 are synchronized or timed with reference to the speed of movement of the decks of the dryer A by a synchronizing unit 140 comprising a cam-operated switch 141. The unit 140 is connected by a sprocket chain drive 142 to the front roller 17 of the lower deck 13 and since the conveyor rollers of all of the decks are driven at the same speed from the motor 30, the switch 141 is rotated in timed relation to the speed of the conveyor. The unit 140 preferably contains means for adjusting the time interval to provide for different length sheets, etc.

Referring to the wiring diagram, the apparatus is placed in operation by depressing the start push button switch 145 to close the normally open contacts 146, 147 thereof and establish a circuit from the power line 148 through the normally closed contacts 150, 151 of the stop push button switch 152, wire 153, the now closed normally open contacts 146, 147 of start push button switch 145, wire 154, normally closed overload contacts 155, 156, wire 157, normally closed overload contacts 158, 159, wire 160, and operating solenoid 161 to line 162. The overload contacts 155, 156, and 158, 159, the operating solenoid 161 and the wires 157, 160 are a part of a motor controller 163 for the motors 62, 62' which drive the pinch rolls and the table of the feeding apparatus. Energization of the operating solenoid 161 of the motor controller 163 closes the normally open contacts 164, 165 also forming a part of the motor controller which establishes a holding circuit around the start push button switch 145 which may now be released. Energization of the operating solenoid 161 also closes the normally open contacts 166, and 167, 168 and 169, 170 and 171 connecting the motors 62, 62' to the power lines 148, 162, 172 starting the motors 62, 62' which, in turn, drive the pinch rolls 34, 35 and the pinch rolls 122, 35' and the belts 120, respectively. The motors continue to operate until stopped by depressing the stop push button switch 152 to open its normally closed contacts and break the holding circuit for the solenoid 161. The start and stop push button switches 145, 152 may be positioned at any convenient location about the machine.

The vertically movable assembly of the feed end unit C may be manually raised or lowered by closing the normally open push button switches 114, 115 previously referred to. Closing normally open push button switch 114 closes its normally open contacts 175, 176 establishing a circuit from the line 148 through the now closed contacts 175, 176, wire 177, overtravel safety limit switch 178, wire 179, normally closed contacts 180, 181 of motor controller 182, wire 183, operating solenoid 184 of motor controller 182, wire 185, and normally closed overload contacts 186, 187 of motor controller 182. Energization of the operating solenoid 184 of motor controller 182 closes the normally open contacts 190 and 191, 192 and 193, 194 and 195, connecting the motor 100 to the power lines 148, 162, 172 in such a manner that the motor rotates in a direction to raise the vertically movable assembly of the fed end unit C. Simultaneously with the closing of the contacts 190 to 195, normally closed contacts 200, 201 are opened, which eliminates any possibility of the motor being accidentally connected to the power lines for rotation in an opposite direction by depressing the lowering push button switch 115. The motor 100 continues to rotate in a direction to raise the pinch rolls 34, 35, etc., as long as switch 114 is held closed or until the safety limit switch 178 opens.

The motor 100 is operated in the opposite direction to lower the vertically movable assembly of the feed end unit C by closing the switch 115 to close the normally open contacts 205, 206 thereof, thereby establishing a circuit from the line 148 through the switch 115, wire 207, down safety limit switch 208, wire 209, normally closed contacts 200, 20', of motor controller 182, wire 210, operating solenoid 211 of motor controller 182, wire 185', and overload contacts 186, 187 to line 162. Energization of the operating solenoid 211 closes the normally open contacts 212 and 213, 214 and 215, and 216 and 217 of motor controller 182, thereby connecting the hoist motor 100 to the power lines 148, 162 and 172 for rotation in the opposite direction; that is, in a direction to lower the movable assembly of the in-feed unit C. The motor continues to operate as long as the switch 115 is held closed or until the safety limit switch 208 opens.

With the motor 30 in operation and the conveyor mechanism or rollers of the decks of the dryer A in operation, the switch 141 forming a part of synchronizing unit 140 will be periodically closed. Assuming that the sheets of veneer being fed to the dryer are eight feet long, the switch 141 is preferably closed, once for each three and one-third feet of travel of the veneer or stock in the dryer. As the operator pushes a sheet of veneer between the pinch rolls 34, 35 and into engagement with the stop 36, the veneer actuates the limit switch 220 forming a part of the vertically movable assembly of the feed end unit C to close its normally open contacts 221, 222; however, nothing further happens until the switch 141 is operated to close normally open contacts 223, 224 thereof and open its normally closed contacts 225, 226. The opening of the normally closed contacts 225, 226 break a holding circuit for an operating solenoid 227 of a relay 228 having normally open contarts 229, 230 and normally closed contacts 231, 232, hereinafter more specifically referred to. The momentary closing of the normally open contacts 223, 224 of switch 141 establishes a circuit from the line 148 through the contacts 223, 224, wire 235, now closed contacts 221, 222 of limit switch 220, wire 236, and operating solenoid 237 of relay 238 to line 162.

Energization of operating solenoid 237 of relay 238 closes the normally open contacts 240 and 241, 242 and 243, 244 and 245 thereof. The closing of the normally open contacts 240, 241 of relay 238 establishes a holding circuit for the relay from the line 148 to the wire 235. The closing of the normally open contacts 242, 243 and 244, 245 of relay 238 connects the operating solenoid 246 of the solenoid valve which controls the flow of pressure fluid to and from the motors 84 to cause the valve to release the pressure fluid in the motor and allow the top roll 35 to drop into engagement with the veneer therebetween and the bottom roll 34. Simultaneously with the movement of the upper roll 35 into engagement with the veneer therethrough, the stop 36 is raised allowing the sheet of veneer to be fed by the pinch rolls onto the belts 120 of the floating conveyor table D.

The re-closing of contacts 225, 226 of switch 141 after being momentarily opened, establishes a circuit from the line 148 through the now closed contacts 225, 226 of switch 141, wire 250, normally closed contacts 231, 232 of relay 228, wire 251 and operating solenoid 252 of relay 253 to line 162. Energization of the operating solenoid 252 of relay 253 closes its normally open contacts 254, 255 establishing a circuit from the line 148 through the contacts 254, 255, wire 256, and operating solenoid 257 of relay 258 to line 162. Energization of the operating solenoid 257 of relay 258 closes its normally open contacts 260 and 261, 262 and 263. The closing of the normally open contacts 260, 261 of relay 258 establishes a circuit from the line 148 through the now closed contacts 225, 226 of switch 141, wire 250, now closed contacts 260, 261 of relay 258, wire 264, and operating solenoid 227 of relay 228 to line 162. The energization of the operating solenoid 227 of relay 228 closes the normally open contacts 229, 230 thereof and opens its normally closed contacts 231, 232. The closing of contacts 229, 230 establishes a holding circuit around the contacts 260, 261 of relay 258 from the wire 250 to the wire 264 and the opening of the normally closed contacts 231, 232 of relay 228 deenergizes the operating solenoid 252 of relay 253 allowing its normally open contacts 254, 255 to open which, in turn, deenergizes the operating solenoid 257 of relay 258.

The closing of normally open contacts 262, 263 of relay 258 establishes a circuit from the line 148 through the wire 265, normally closed contacts 266, 267 of selecting switch 268, wire 270, normally closed contacts 271, 272 of up travel, safety limit switch 273, wire 274, normally closed contacts 275, 276 of limit switch 277 connected to the frame of the discharge end unit E, wire 278, contacts 280, 281 of motor controller 282, wire 283, operating solenoid 284 of motor controller 282, wire 285, and overload contacts 286, 287 of motor controller 282 to line 162.

Energization of the operating solenoid 284 of motor controller 282 closes the normally open contacts 288 and 289, 290 and 291, 292 and 293, 294 and 295 and opens the normally closed contacts 296 and 297. The closing of the normally open contacts 288, 289 of motor controller 282 establishes a holding circuit for the operating solenoid 284 thereof around the contacts 262, 263, of relay 258 from the line 148 to the wire 265. The closing of the normally open contacts 290 and 291, 292 and 293, 294 and 295 of motor controller 282 connects the discharge end unit hoist motor 100′ to the power lines 148, 162, 172 so that it operates in a direction to raise the vertically movable assembly of the discharge end unit E. The motor continues to operate and the unit to raise until limit switch 277 which is connected to the frame of the discharge end unit E is opened by an adjustable stop 298 carried by a rod 299 connected to the right-hand plate 52′ of the discharge end unit E, there being one such stop for each of the intermediate decks of the dryer. The opening of the normally closed contacts 275, 276 of limit switch 277 breaks the circuit for the operating solenoid 284 of the motor controller 282 causing the motor to stop and the solenoid release brake associated therewith to be applied. The discharge end unit is now in position to discharge the sheet of veneer being fed to the table D onto the deck with which the pinch rolls 122, 35′ thereof are now aligned; that is, deck 12 which is the second deck from the bottom.

When the sheet of veneer being fed passes through the feed or pinch rolls 34, 35 of the feed end unit C, the switch 220 which has held closed by the veneer operates to open its normally open contacts 221, 222, thus breaking the circuit for the operating solenoid 237 of relay 238 which, in turn, deenergizes the operating solenoid 246 of the solenoid valve, allowing pressure fluid to be again applied to the motors 84 to raise the top roll 35 and lower the stop 36. The sheet of veneer is fed onto the deck of the dryer at a considerably higher speed than that at which it travels through the dryer because the feeding mechanism feeds four decks successively.

After a sheet of veneer has been fed onto one of the decks, the cycle of operations just described is repeated by the switch 141 being again operated instantaneously by the synchronizing mechanism. As the verically movable assembly of the discharge end unit E reaches the third deck from the bottom; that is, deck 11, it is stopped by an adjustable stop 300 similar to the stop 298 previously referred to. When the vertically movable assembly reaches the top deck with the pinch rolls 122, 35′ in alignment with the top deck 10 of the dryer A, a cam 301 on the frame of the discharge end unit E operates the selecting switch 268 to open the previously closed contacts 266, 267 thereof and close contacts 302, 303 of the selecting switch 268. Upon the next operation of the sequence switch 141 and the resultant closing of the normally open contacts 262, 263 of relay 258, as previously described, a circuit is established which causes the discharge unit hoist motor 100′ to operate in a direction to lower the vertically movable assembly to its bottom position; that is, with the pinch rolls 122, 35′ in alignment with the lower deck 13 of the dryer A. With the selecting switch 268 in the position just referred to, the closing of the normally open contacts 262, 263 of relay 258 establishes a circuit from the line 148 through the contacts 262, 263, wire 265, now closed contacts 302, 303 of selecting switch 268, wire 304, normally closed contacts 305, 306 of down travel safety limit switch 307, wire 308, normally closed contacts 296, 297 of motor controller 282, wire 309, operating solenoid 310 of motor controller 282, wire 285, and overload contacts 286, 287 to line 262, thereby energizing the solenoid 310 and closing the normally open contacts 311 and 312, 313 and 314 , 315 and 316, 317 and 318 of motor controller 282. The closing of normally open contacts 311, 312 establishes a holding circuit for the operating solenoid 310 around the contacts 262, 263 of relay 258.

The closing of the normally open contacts 313 and 314, 315 and 316, 317 and 318 connects the discharge unit hoist motor 100′ to the power lines 148, 162, 172 in such a manner that the motor rotates in a direction to lower the vertically movable assembly including the pinch rolls 122, 35′. The motor continues to operate and the assembly to descend until the assembly reaches the lower position, at which time the selecting switch 268 is again operated by a cam 319 on the frame of the discharge end unit to open contacts 302, 303 thereof to deenergize the operating solenoid 310 and stop the motor. Operation of the selecting switch 268 to open the contacts 302, 303 thereof causes contacts 266, 267 of the switch to subsequently close and reestablish the circuit so that the discharge unit hoist motor 100′ will be operated in the reverse direction; that is, in the direction to raise the vertically movable assembly of the hoist unit E upon the next closing of the normally open contacts 262, 263 of relay 258 upon the subsequent actuation of the switch 141. The cycle of operations continues with the feeding mechanism delivering veneer to the decks of the dryer in sequence as long as the machine is continued in operation and veneer is introduced between the pinch rolls 34, 35 of the feed end unit C.

Provision is made for manually controlling the dropping of the upper pinch roll 35 in the form of a push button switch 320 comprising normally open contacts 321, 322, the closing of which establishes a circuit from the line 148 through the contacts 321, 322, wire 236, and operating solenoid 237 of relay 238 to the line 162. The discharge unit hoist motor 100′ can be operated in either direction by the operation through the medium of push button switches 323, 324. When the push button switch 323 is operated to close its normally open contacts 325, 326, the operating solenoid 284 of motor controller 282 is energized and causes the motor to operate in a direction to raise the vertically movable assembly of the discharge end unit E. When the push button switch 324 is operated to close its normally open contacts 327, 328, the operating solenoid 310 of motor controller 282 is energized and causes the motor to operate in a direction to lower the vertically movable assembly of the discharge end unit E.

While the invention has been herein illustrated and described as though a single row of veneer was being processed at one time, the usual practice is to process a plurality of [rolls] *rows* simultaneously, the number depending upon the width of the veneer sheets being treated and the width of the dryer, etc. It is also to be understood that the vertically movable assembly of the feed end unit C may be positioned at some convenient height above the floor and the veneer fed thereto in any suitable manner, either manually or automatically. Regardless of how the sheets of veneer are brought to and inserted between the pinch rolls 34, 35 of the feed end unit, the feed mechanism of the present invention will automatically feed veneer to a multiple deck dryer in predetermined sequence and in properly spaced relation with respect to the other veneer on the various decks.

Figure 9:
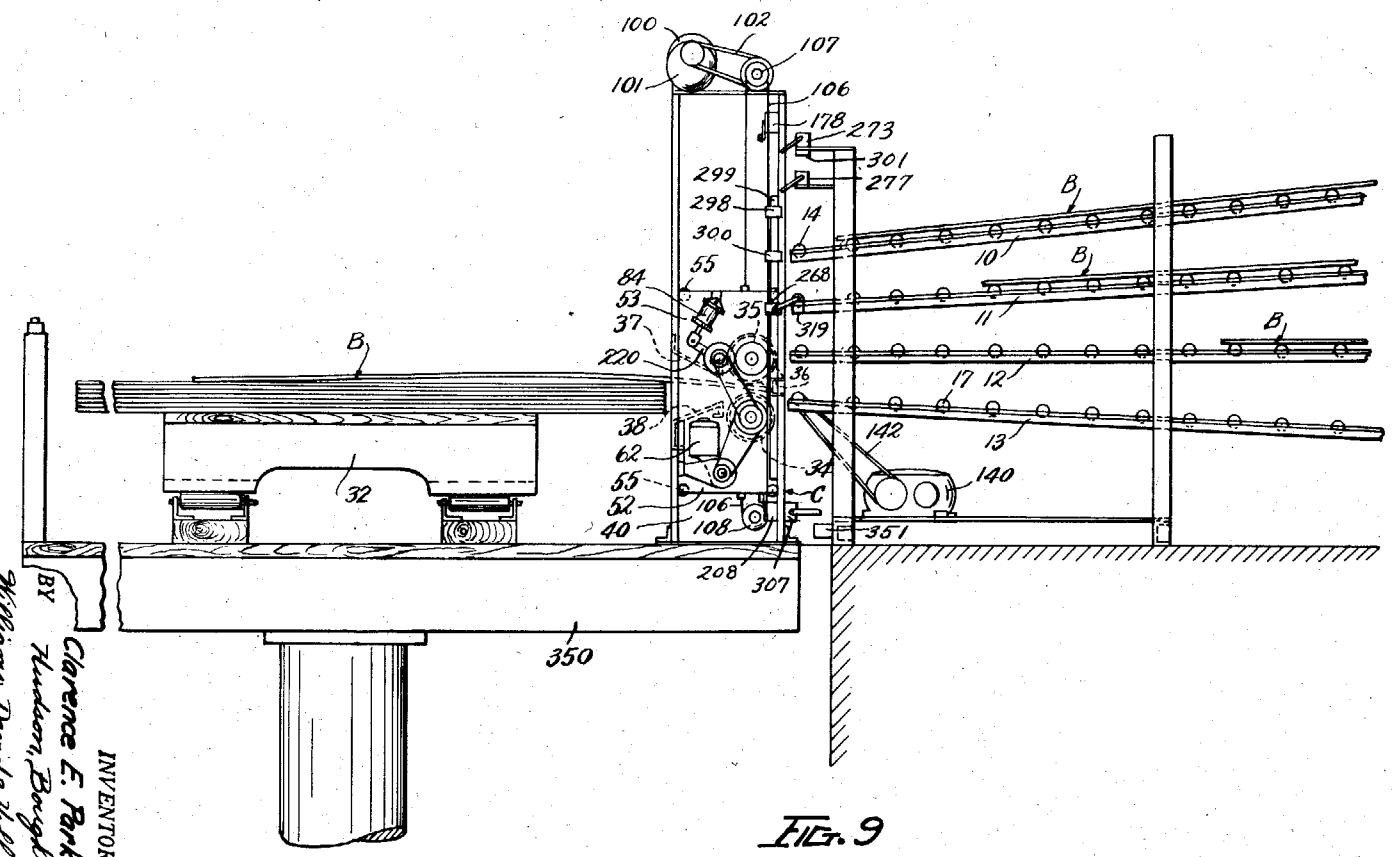
Fig. 9 is a side elevational view showing a different embodiment of the invention.

In the alternative construction shown in Fig. 9, the floating table D and the discharge end unit E are omitted and the feed end unit C and the portion of track which supports the truck or trucks 32 in position for feeding the veneer to the feed end unit C are both mounted on a vertically movable platform or elevator 350. The elevator shown is of the hydraulic type operated by an electric motor driven pump and is moved vertically to align the pinch rolls 34, 35 of the feed end unit C with the particular deck 10, 11, 12, or 13 which it is desired to feed either manually or automatically in a manner similar to that in which the vertically movable assembly of the discharge end unit is aligned with the various decks previously described. The motor 62' is omitted, the motor, not shown, which operates the elevator 350 is substituted for the motor 100'.

Since the vertical movement of the elevator 350 and the entire unit C will correspond to the movement of the vertically movable assembly comprising end plates 52' of the discharge end unit E in the first described embodiment, the control switch 268 is attached to the assembly comprising the end plates 52, and the spaced stops 301, 319 for actuating the switch are appropriately attached to the frame of the conveyor decks 10 to 13, and operate the switch in manner described previously, when the elevator moves vertically. Likewise, the switches 273 and 277 are supported on the conveyor deck frame and are actuated by the stops 298, 300 attached to the rod 299 which is in turn attached to one of the end plates 52 of the pinch roll assembly and the stops cooperating with the switches control the position of the elevator to successively align the pinch rolls 34, 35 with the respective conveyor decks, and limits the upward elevation of the assembly. The safety downward travel limit switch 307 is attached to the lower part of the frame of the end unit C and cooperates with a stop 351 to discontinue operation of the pump motor similar to the manner in which it operates to stop elevator motor 100' in the first described embodiment.

In the form of the invention shown in Figs. 1 to 8, the vertically movable assembly of the discharge end unit E is moved vertically as the veneer sheets feed between the pinch rolls 34, 35. In the embodiment shown in Fig. 9, however, the veneer is fed directly from the pinch rolls to the conveyor decks and therefore the vertical movement of the elevator to align the pinch rolls with the next above conveyor deck must not occur until after the veneer has moved from the pinch rolls and prior to the feeding of a succeeding sheet therebetween. This action is accomplished by installing a normally closed switch in the wire 250 between the contacts 225, 226 of time switch 141 and contacts 231, 232 of the electromagnetic relay 228, which switch is opened by the solenoid 237 when it is energized by closure of the contacts 221, 222 of the veneer operated switch 220.

The pinch roll unit can be adjusted vertically to accommodate the pinch rolls to the top position of the stack of veneer to be fed therethrough by manual operation of the push buttons 114, 115 as described hereinbefore, and at the same time, the vertical position of the elevator should be correspondingly adjusted to maintain the pinch rolls within their range of movement into alignment with the respective conveyor decks 10–13 by operation of the manual control push buttons 323, 324 as described hereinbefore.

From the foregoing it will be apparent that the objects heretofore enumerated and others have been accomplished and that there has been provided a novel and improved apparatus for feeding veneer to a multiple deck dryer, or, in fact any similar sheet material to a multiple deck machine in predetermined sequence and in predetermined spaced relation. While the preferred embodiment of the invention has been described with considerable detail, the invention is not limited to the particular construction shown and it is the intention to cover hereby all adapations, modifications and uses thereof which come within the practice of those skilled in the art to which the invention relates and the scope of the appended claims.

Having thus described my invention, I claim:

1. In equipment for loading material in sheet form into a multiple deck conveyor type machine having power driven conveyor decks, the combination of a feed end unit to feed sheet material to said deck conveyors, said unit comprising a frame and a pair of pinch rolls, means for driving said pinch rolls, means for producing relative movement of said pinch rolls toward and from each other, and means for automatically controlling the movement of said pinch rolls toward each other including a control device actuated by a sheet moving between said pinch rolls and a device operated at intervals proportional to the speed of the conveyor decks and cooperating with the first mentioned control device to initiate movement of said pinch rolls toward each other.

2. In equipment for loading material in sheet form into a multiple deck conveyor type machine, the combination of a feed end unit comprising a frame, a vertically movable assembly carried by said frame, manually controlled power means for moving said assembly vertically, a pair of pinch rolls carried by said assembly, means for producing relative movement of said pinch rolls toward and from each other, and means for automatically controlling the movement of said pinch rolls toward each other comprising a device actuated by a sheet moved between said pinch rolls and an intermittently operated device operated at predetermined intervals and cooperating with the first mentioned control device to initiate movement of said pinch rolls toward each other.

3. In equipment for loading material in sheet form into a multiple deck conveyor type machine, the combination of a feed end unit comprising a frame and a pair of pinch rolls, means for driving said pinch rolls, means for producing relative movement of said pinch rolls toward and from each other, a conveyor type table having its feed end adjacent to said pinch rolls, a discharge end unit comprising a frame and a vertically movable assembly having the opposite end of said conveyor type table connected thereto for movement therewith, and means for moving said vertically movable assembly of said discharge end unit in timed relation to the relative movement of said pinch rolls toward and from each other.

4. In equipment for loading material in sheet form into a multiple deck conveyor type machine, the combination of a feed end unit comprising a frame and a pair of pinch rolls, means for driving said pinch rolls, means for producing relative movement of said pinch rolls toward and from each other, a conveyor type table having its feed end adjacent to said pinch rolls, a discharge end unit comprising a frame and a vertically movable assembly including a pair of pinch rolls, means for pivotally connecting the discharge end of said conveyor type table to said vertically movable assembly for movement therewith, and means for moving said vertically movable assembly of said discharge end unit in timed relation to the relative movement of said pinch rolls toward and from each other.

5. In equipment for feeding material in sheet form into a multiple deck conveyor type machine, the combination of a feed end unit comprising a frame and a vertically movable assembly including a pair of pinch rolls, means for raising and lowering said assembly, means for driving said pinch rolls, means for producing relative movement of said pinch rolls toward and from each other, a conveyor type table connected at one end to said vertically movable assembly for movement therewith, a discharge end unit comprising a frame and a vertically movable assembly having the opposite end of said conveyor type table connected thereto for movement therewith, and means for moving said vertically movable assembly of said discharge end unit in timed relation to the relative movement of said pinch rolls toward and from each other.

6. In equipment for feeding material in sheet form into a multiple deck conveyor type machine, the combination of a feed end unit comprising a frame and a vertically movable assembly including a pair of pinch rolls, means for raising and lowering said assembly, means for driving said pinch rolls, means for producing relative movement of said pinch rolls toward and from each other, a conveyor type table connected at one end to said vertically movable assembly for movement therewith, a discharge end unit comprising a frame and a vertically movable assembly including a pair of pinch rolls, means for pivotally connecting the discharge end of said conveyor type table to said vertically movable assembly for movement therewith, and means for moving said vertically movable assembly of said discharge end unit in timed relation to the relative movement of said pinch rolls toward and from each other.

7. In equipment for feeding material in sheet form into a multiple deck conveyor type machine, the combination of a feed end unit comprising a frame and a vertically movable assembly including a pair of pinch rolls, means for raising and lowering said assembly, means for driving said pinch rolls, means for producing relative movement of said pinch rolls toward and from each other, a conveyor type table connected at one end to said vertically movable assembly for movement therewith, a discharge end unit comprising a frame and a vertically movable assembly having the opposite end of said conveyor type table connected thereto for movement therewith, and means for moving said vertically movable assembly of said discharge end unit in timed relation to the relative movement of said pinch rolls toward and from each other, said last-named means comprising a control mechanism adapted to be operatively connected to the conveyor mechanism of said machine whereby said pinch rolls and said vertically movable assembly of said discharge end unit are moved in timed relation to the speed of the conveyor.

8. In equipment for loading material in sheet form into a multiple deck conveyor type machine, the combination of a feed unit comprising a frame, a vertically movable unit carried by said frame and including a pair of pinch rolls, means for driving said pinch rolls, means for producing relative movement of said pinch rolls toward and from each other, and power means for moving said frame vertically a predetermed distance to move the pinch rolls from a sheet discharge position relative to one of the multiple decks of the machine to a sheet discharge position relative to an adjacent one of the multiple decks in timed relation to the relative movement of said pinch rolls toward and from each other.

9. In equipment for feeding material in sheet form into a multiple deck conveyor type machine, the combination of a feed unit comprising a frame, elevator means for supporting said frame, a vertically movable assembly carried by said frame and including a pair of pinch rolls, means for raising and lowering said assembly, means for driving said pinch rolls, means for producing relative movement of said pinch rolls toward and from each other, and means for actuating said elevator means to move said frame vertically in timed relation to the relative movement of said pinch rolls toward and from each other.

10. In equipment for loading sheet *veneer* material *from a stack of veneer sheets* into a multiple power driven conveyor deck type machine, a sheet feeding mechanism including power driven elevating means shiftable vertically to direct sheet material into different ones of the multiple conveyor decks of the machine *and pinch roll means for advancing a veneer sheet,* [and] control means to intermittently initiate operation of said elevating means at intervals which are a function of the speed of the conveyor decks, [which] *said* control means [includes] *including* a control device operated in [synchronism] *timed relation* with the power driven conveyor decks, *and means for intermittently operating said pinch roll means in timed relation to the vertical movement of said elevating means.*

11. In equipment for loading sheet *veneer* material into a multiple power driven conveyor deck type machine *from a stack of veneer sheets supported in spaced relation with respect to the machine,* a sheet feeding mechanism including *pinch roll means for advancing a veneer interposed between the stack of veneer sheets and the machine and* power driven elevating means shiftable vertically to direct sheet material into different ones of the multiple [conveyor] decks of the machine, [and] electrical control means to intermittently initiate operation of said elevating means at intervals which are a function of the speed of the conveyor decks, [which] *said* electrical control means [includes] *including* an [electric] *electrical* switch opened and closed in [synchronism] *timed relation* with the power driven conveyor decks, *and means for intermittently operating said pinch roll means in timed relation with said elevating means.*

12. In equipment for loading sheet material into a multiple power driven conveyor deck type machine, a power driven sheet feeding unit operative to move sheets toward the machine, and control means for said sheet feeding unit comprising a control device actuated by a sheet moved into feeding position with respect to said sheet feeding unit and a control device operated in synchronism with the driven conveyor decks of the machine and cooperating with the first mentioned control device at intervals proportional to the speed of the conveyor decks to render said sheet feeding unit operative.

13. In equipment for loading sheet material into a multiple power driven conveyor deck type machine, a power driven pinch roll mechanism operative to move sheets toward the machine, and control means to intermittently render said pinch roll mechanism operative comprising a control device actuated by a sheet moved to feed position relative to said pinch roll, a control device operated in synchronism with the driven conveyor decks of the machine and cooperating with the first mentioned control device at intervals proportional to the speed of the conveyor decks to render said pinch roll mechanism operative.

14. In equipment for loading sheet *veneer* material into a multiple power driven deck conveyor type machine *from a stack of veneer sheets supported in spaced relation with respect to the machine,* the combination of a power operated sheet feeding mechanism *including pinch roll means for advancing a sheet of veneer interposed between the stack of veneer sheets and the machine,* power means for moving said sheet feeding mechanism into *sheet feeding* alignment with the respective conveyor decks, and control means for actuating said power operated sheet feeding mechanism and said power means in [synchronism] *timed relation,* said control means including a device operating in [synchronism] *timed relation* with the power operated conveyor decks.

15. In equipment for loading sheet material into a multiple conveyor deck type machine, the combination of a frame, a sheet feeding unit carried by said frame for vertical movement, power actuated means for moving said sheet feeding unit, a second frame spaced from the first mentioned frame and adjacent to the multiple deck conveyor machine, a sheet discharge unit carried by said second frame for vertical movement to discharge sheets onto any of the multiple decks of the conveyor machine, a sheet conveyor structure connected at one end with said sheet feeding unit and at the other end with said sheet discharge unit and operative to transfer sheets from said sheet feeding unit to said sheet discharge unit, and automatically controlled power actuated means to raise and lower said sheet discharge unit.

16. In equipment for loading sheet material into a multiple conveyor deck type machine, the combination of a frame, a sheet feeding unit carried by said frame for vertical movement, power actuated means for moving said sheet feeding unit, a second frame spaced from the first mentioned frame and adjacent to the multiple deck conveyor machine, a sheet discharge unit carried by said second frame for vertical movement to discharge sheets onto any of the multiple decks of the conveyor machine, a telescoping sheet conveyor structure connected at one end with said sheet feeding unit and at the other end with said sheet discharge unit and operative to transfer sheets from said sheet feeding unit to said sheet discharge unit, and automatically controlled power actuated means to raise and lower said sheet discharge unit, said telescoping conveyor structure being shortened as said units approach a common level and lengthening when said units move from a common level.

17. In equipment for loading material in sheet form into a multiple deck power driven conveyor type machine, the combination of vertically movable feed means having an entering end and a discharge end, said feed means including a pair of pinch rolls, means for driving said pinch rolls, power actuated means for vertically moving said entering end of said feed means, power actuated means for producing relative movement of said pinch rolls toward and from each other, and automatically controlled power actuated means for moving said discharge end of said feed means vertically in timed relation to the relative movement of said pinch rolls relative to each other.

*18. In equipment for loading sheet veneer material from a stack of veneer sheets into a multiple power driven conveyor deck type machine, means for supporting a stack of veneer sheets in spaced relation with respect to the machine, a sheet feeding mechanism including power driven elevating means shiftable vertically to direct sheet material into different ones of the multiple conveyor decks of the machine and pinch roll means intermediate the stack of veneer sheets and the machine for advancing a veneer sheet, means for producing relative movement between said means for supporting the stack of veneer sheets and said pinch roll means whereby substantial alignment may be maintained between the top of the stack of veneer sheets and said pinch roll means, control means to intermittently initiate operation of said elevating means at intervals which are a function of the speed of the conveyor decks, said control means including a control device operated in timed relation with the power driven conveyor decks, and means for intermittently operating said pinch roll means in timed relation to the vertical movement of said elevating means.*

*19. In equipment for loading sheet veneer material from a stack of veneer sheets into a multiple power driven conveyor deck type machine, means for supporting a stack of veneer sheets in spaced relation with respect to the machine, a sheet feeding mechanism interposed between the stack of veneer sheets and the machine and having a feed end and a discharge end, said sheet feeding mechanism comprising pinch roll means adjacent to each of said ends and including power driven elevating means for shifting said discharge end vertically to direct sheet material into different ones of the multiple conveyor decks of the machine, means for producing relative movement between said means for supporting the stack of veneer sheets and said feed end of said sheet feeding mechanism whereby substantial alignment may be maintained between the top of the stack of veneer sheets and said pinch roll means at said feed end of said sheet feeding mechanism, control means to intermittently initiate operation of said elevating means at intervals that are a function of the speed of the conveyor decks, and means for actuating said pinch roll means adjacent to said feed end in timed relation to the vertical movement of said discharge end.*

*20. In equipment for loading sheet veneer material into a multiple power driven deck conveyor type machine, means for supporting a stack of veneer sheets in spaced relation with respect to the machine, a sheet feeding mechanism including pinch roll means for advancing a veneer interposed between the stack of veneer sheets and the machine and power driven elevating means shiftable vertically to direct sheet material into different ones of the multiple decks of the conveyor machine, means for producing relative movement between said means for supporting the stack of veneer sheets and said pinch roll means whereby substantial alignment may be maintained between the top of the stack of veneer sheets and said pinch roll means, electrical control means to intermittently initiate operation of said elevating means at intervals which are a function of the speed of the conveyor decks, said electrical control means including an electrical switch open and closed in timed relation with the power driven conveyor decks, and means for intermittently operating said pinch roll means in timed relation with said elevating means.*

*21. In equipment for loading sheet veneer material from a stack of veneer sheets into a multiple power driven conveyor deck type machine, means for supporting a stack of veneer sheets in spaced relation with respect to the machine, a sheet feeding mechanism interposed between the stack of veneer sheets and the machine and having a feed end and a discharge end, said sheet feeding mechanism comprising pinch roll means adjacent to each of said ends and including power driven elevating means for shifting said discharge end vertically to direct sheet material into different ones of the multiple conveyor decks of the machine, means for producing relative movement between said means for supporting the stack of veneer sheets and said feed end of said sheet feeding mechanism whereby substantial alignment may be maintained between the top of the stack of veneer sheets and said pinch roll means at said feed end of said sheet feeding mechanism, electrical control means to intermittently initiate operation of said elevating means at intervals that are a function of the speed of the conveyor decks, said electrical control means including an electric switch opened and closed in timed relation with the power operated conveyor decks, and means for actuating said pinch roll means adjacent to said feed end in timed relation to the vertical movement of said discharge end.*

*22. In equipment for loading sheet veneer material into a multiple power driven deck conveyor type machine, means for supporting a stack of veneer sheets in spaced relation with respect to the machine, the combination of a power operated sheet feeding mechanism including pinch roll means for advancing a sheet of veneer interposed between the stack of veneer sheets and the machine, power means for moving said sheet feeding mechanism into alignment with the respective conveyor decks, means for producing relative movement between said means for supporting the stack of veneer sheets and said pinch roll means whereby substantial alignment may be maintained between the top of the stack of veneer sheets and said pinch roll means, and control means for intermittently*

*actuating said pinch roll means in timed relation with the movement of said sheet feeding mechanism into alignment with the respective conveyor decks.*

*23. In equipment for loading sheet veneer material from a stack of veneer sheets into a multiple power driven deck conveyor type machine, means for supporting a stack of veneer sheets in spaced relation with respect to the machine, the combination of a power operated sheet feeding mechanism interposed between the stack of veneer sheets and the machine and having a feed end adjacent to the stack of veneer sheets and a discharge end adjacent to the machine, said sheet feeding mechanism comprising pinch roll means adjacent to each of said ends, power means for moving said discharge end of said sheet feeding mechanism into alignment with the respective conveyor decks, means for producing relative movement between said means for supporting the stack of veneer sheets and said feed end of said sheet feeding mechanism whereby substantial alignment may be maintained between the top of the stack of veneer sheets and said pinch roll means at said feed end of said sheet feeding mechanism, and control means for intermittently actuating said pinch roll means in timed relation with the movement of said discharge end of said sheet feeding mechanism into alignment with the respective conveyor decks.*

*24. In equipment for loading sheet veneer material from a stack of veneer sheets into a multiple power driven deck conveyor type machine, the combination of a multiple deck driven conveyor section in advance of the machine, means for supporting a stack of veneer sheets in spaced relation with respect to said conveyor section, a power operated sheet feeding mechanism comprising pinch roll means intermittently operable to advance a veneer sheet interposed between the stack of veneer sheets and said conveyor section, power means for selectively producing relative vertical movement between said means for supporting said stack of veneer sheets and said pinch roll means whereby substantial alignment may be maintained between the top of the stack of veneer sheets and said pinch roll means, power means for producing relative vertical movement between said sheet feeding mechanism and said conveyor section in opposite directions to align said sheet feeding mechanism with the respective decks of said conveyor section, and means for operating said pinch roll means in timed relation with the relative movement between said sheet feeding mechanism and the decks of said conveyor section.*

*25. In equipment for loading veneer sheets into a machine of the type having a plurality of separate power-driven conveyor decks arranged vertically above one another, a sheet-feeding mechanism having a feed end and a discharge end, said sheet-feeding mechanism being aligned in direction of feeding movement with the direction of feeding movement of said conveyor decks and having its discharge end adjacent thereto, power-driven elevating means for shifting the discharge end of said mechanism vertically in intermittent steps into horizontal alignment successively with said conveyor decks, said sheet-feeding mechanism including pinch roll means for advancing a veneer sheet, means intermittently to actuate said elevating means at intervals which are a function of the speed of said conveyor decks including a control device operated in timed relation with said conveyor decks, and means for intermittently operating said pinch roll means during the intervals between successive steps of movement of said elevating means whereby successive veneer sheets presented to said pinch roll means are advanced along said sheet-feeding mechanism onto successive ones of said conveyor decks.*

References Cited in the file of this patent or the original patent

UNITED STATES PATENTS

| | | |
|---|---|---|
| 644,520 | Jones | Feb. 27, 1900 |
| 1,141,277 | Smith | June 1, 1915 |
| 1,307,969 | Harris | June 24, 1919 |
| 1,570,592 | Parker | Jan. 19, 1926 |
| 1,913,533 | Brunner | June 13, 1933 |
| 1,949,281 | Moore | Feb. 27, 1934 |
| 2,058,729 | Sekulski | Oct. 27, 1936 |
| 2,246,508 | Davidson | June 24, 1941 |